(12) United States Patent
Toyama

(10) Patent No.: US 12,247,752 B2
(45) Date of Patent: Mar. 11, 2025

(54) ABNORMALITY CAUSE ESTIMATION DEVICE, ABNORMALITY CAUSE ESTIMATION METHOD, AND MEDIUM

(71) Applicant: MITSUBISHI ELECTRIC CORPORATION, Tokyo (JP)

(72) Inventor: Yasuhiro Toyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 929 days.

(21) Appl. No.: 17/347,876

(22) Filed: Jun. 15, 2021

(65) Prior Publication Data

US 2021/0310679 A1    Oct. 7, 2021

Related U.S. Application Data

(63) Continuation of application No. PCT/JP2019/001638, filed on Jan. 21, 2019.

(51) Int. Cl.
*F24F 11/38* (2018.01)
*F24F 11/63* (2018.01)

(52) U.S. Cl.
CPC .............. *F24F 11/38* (2018.01); *F24F 11/63* (2018.01)

(58) Field of Classification Search
CPC ........ F24F 11/38; F24F 11/63; G05B 23/0232
See application file for complete search history.

(56) References Cited

U.S. PATENT DOCUMENTS

| 9,251,472 B1* | 2/2016 | Linowes .................. F24F 11/49 |
| 2013/0132000 A1* | 5/2013 | Tamaki .............. G05B 23/0281 |
| | | 702/35 |
| 2017/0083016 A1 | 3/2017 | Imanari et al. |
| 2018/0157249 A1* | 6/2018 | Muto ..................... G06V 40/20 |

FOREIGN PATENT DOCUMENTS

| EP | 3 249 483 A1 | 11/2017 |
| JP | 2004-164023 A | 6/2004 |
| JP | 2011-243118 A | 12/2011 |
| JP | 2012-150721 A | 8/2012 |
| JP | 2013-61695 A | 4/2013 |

(Continued)

OTHER PUBLICATIONS

Japanese Office Action for Japanese Application No. 2020-567675, dated Jun. 22, 2021, with an English translation.

(Continued)

*Primary Examiner* — Zhipeng Wang
(74) *Attorney, Agent, or Firm* — Birch, Stewart, Kolasch & Birch, LLP

(57) ABSTRACT

The abnormality cause device includes a sensor data acquiring unit for acquiring sensor data from a sensor installed in a target device, an abnormal tendency detecting unit for detecting an abnormal tendency of the sensor data by comparing the sensor data acquired by the sensor data acquiring unit with a normal model showing a normal value range of the sensor data, and an abnormality cause estimating unit for estimating an abnormality cause of the target device by comparing the abnormal tendency detected by the abnormal tendency detecting unit with an abnormality cause model in which an abnormal tendency of past sensor data and an abnormality cause of the target device are associated with each other.

6 Claims, 9 Drawing Sheets

(56) References Cited

FOREIGN PATENT DOCUMENTS

| JP | 2014-96050 A | 5/2014 |
| JP | 2015-76058 A | 4/2015 |
| JP | 2015-103218 A | 6/2015 |

OTHER PUBLICATIONS

German Office Action for German Application No. 11 2019 006 255.7, dated Nov. 3, 2022, with an English translation.
International Search Report (PCT/ISA/210) issued in PCT/JP2019/001638 mailed on Mar. 5, 2019.
Japanese Office Action for Application No. 2020-567675 dated Mar. 9, 2021.
Chinese Office Action and Search Report for Chinese Application No. 201980089324.8, dated Mar. 29, 2024, with English translation.

\* cited by examiner

FIG. 3

| Time | Air Temperature | Vibration | Rotation Speed | Contact 1 Current | Contact 1 Voltage | Contact 2 Current | Contact 2 Voltage | ... |
|---|---|---|---|---|---|---|---|---|
| 2015/01/01 12:00:00 | 20 | 13 | 60 | 100 | 100 | 80 | 100 | ... |
| 2015/01/01 12:00:01 | 20 | 14 | 65 | 120 | 100 | 100 | 100 | ... |
| 2015/01/01 12:00:02 | 20 | 15 | 70 | 140 | 100 | 110 | 100 | ... |
| 2015/01/01 12:00:03 | 20 | 14 | 60 | 120 | 100 | 100 | 100 | ... |
| ... | ... | ... | ... | ... | ... | ... | ... | ... |

FIG. 5A
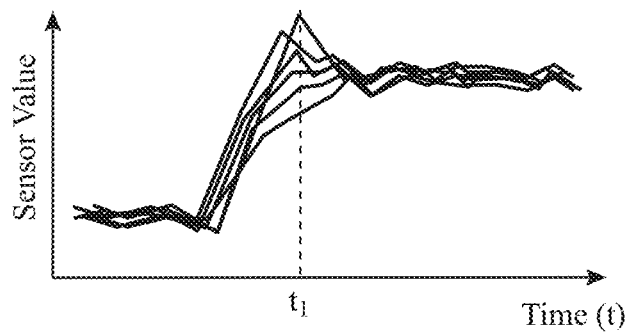
FIG. 5B
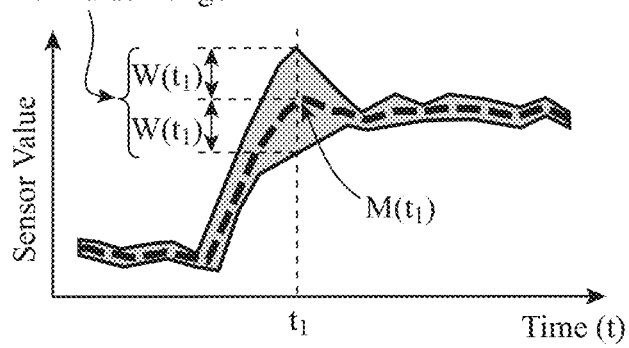
FIG. 6
| Phase | Detected Signal | Abnormal Tendency | Abnormality Cause |
|---|---|---|---|
| Start | Signal 1 | Excessive | Setting Failure |
| Steady | Signal 2 | Vibration | Equipment Failure |
| : | : | : | : |

ABNORMALITY CAUSE ESTIMATION DEVICE, ABNORMALITY CAUSE ESTIMATION METHOD, AND MEDIUM

CROSS REFERENCE TO RELATED APPLICATIONS

This application is a Continuation of PCT International Application No. PCT/JP2019/001638, filed on Jan. 21, 2019, which is hereby expressly incorporated by reference into the present application.

TECHNICAL FIELD

The present invention relates to an abnormality cause estimation device that estimates an abnormality cause of a device.

BACKGROUND ART

In order to streamline the maintenance work of a target device such as plant equipment, manufacturing equipment, elevator, air conditioner, etc., when an abnormality such as a failure or malfunction occurs in the target device, it is useful to identify an abnormality cause of the target device, and to predict and prevent abnormality occurrence of the target device. Documents relating to such a technique, for example, include Patent Literature 1.

Patent Literature 1 describes a process monitoring and diagnostic device aiming at giving a guideline for determining what kind of action should be taken when an abnormality occurs in a target device to a plant manager or an operator in a plant.

The process monitoring and diagnostic device acquires process data measured by a sensor installed in the target process, and determines an abnormality level by determining whether or not the abnormality detection data calculated on the basis of the process data exceeds a threshold value calculated on the basis of a degree of deviation of the process data. In addition, the process monitoring and diagnostic device calculates a contribution amount for each process variable with respect to the abnormality detection data. The process variable represents an operation amount sensor and a process sensor, and the contribution amount indicates how much the process variable contributes to an abnormality that occurs. The process monitoring and diagnostic device determines how many process variables whose contribution amount exceeds the threshold value are extracted, and thereby identifies whether the type of abnormality is due to an abnormality in the operation amount sensor and the process sensor, or an abnormality in the process.

CITATION LIST

Patent Literature

Patent Literature 1: JP 2014-96050 A

SUMMARY OF INVENTION

Technical Problem

As in the invention described in the above-described Patent Literature 1, in the conventional method, when an abnormality cause is identified for a target device such as plant equipment, manufacturing equipment, elevator, air conditioner, etc., an abnormality cause of the target device is estimated on the basis of a signal deviating from the normal data by a certain amount or more. In this method, the determination of whether or not the signal deviates from the normal data is simply the threshold value determination of whether or not the signal exceeds the threshold value, and when a plurality of signals exceed the threshold value, a combination of signals exceeding the threshold value and the abnormality causes of the target device are associated with each other on a one-to-one basis.

However, in the above method, since there are only two cases, one is when the signal exceeds the threshold value and the other is when the signal does not exceed the threshold value, a plurality of candidates for abnormality causes may be estimated. In that case, only a plurality of candidates for abnormality causes are shown, and the abnormality causes cannot be identified.

The present invention has been made to solve the above-mentioned problems, and aims at providing a technique capable of identifying an abnormality cause rather than estimating an abnormality cause by threshold value determination in a technique for estimating an abnormality cause of a target device.

Solution to Problem

The abnormality cause estimation device according to the present invention includes: processing circuitry configured to acquire sensor data from a sensor installed in a target device; detect an abnormal tendency of the sensor data by comparing the acquired sensor data with a normal model showing a normal value range of the sensor data; estimate an abnormality cause of the target device by comparing the detected abnormal tendency with an abnormality cause model in which an abnormal tendency of past sensor data and an abnormality cause of the target device are associated with each other; acquire additional data related to the target device; classify the acquired sensor data for each group according to the acquired additional data; detect the abnormal tendency of the sensor data by comparing the classified sensor data with the normal model corresponding to a group of the sensor data; and estimate the abnormality cause of the target device by comparing a group of the sensor data and the detected abnormal tendency with the abnormality cause model in which a group being identical to the group of the sensor data, the abnormal tendency of the past sensor data, and the abnormality cause of the target device are associated with each other.

Advantageous Effects of Invention

In the technique of estimating an abnormality cause of a target device, it is possible to identify an abnormality cause rather than estimating an abnormality cause by threshold value determination.

BRIEF DESCRIPTION OF DRAWINGS

FIG. 3 is a table for explaining sensor data used by the abnormality cause estimation device according to the first embodiment.

FIGS. 5A and 5B are each a graph for explaining an example of a normal model generated and used by the abnormality cause estimation device according to the first embodiment.

FIG. 6 is a graph for explaining an example of an abnormality cause model generated and used by the abnormality cause estimation device according to the first embodiment.

DESCRIPTION OF EMBODIMENTS

Hereinafter, in order to explain this invention in more detail, a mode for carrying out the present invention will be described by referring to the accompanying drawings.

First Embodiment

Figure 1:
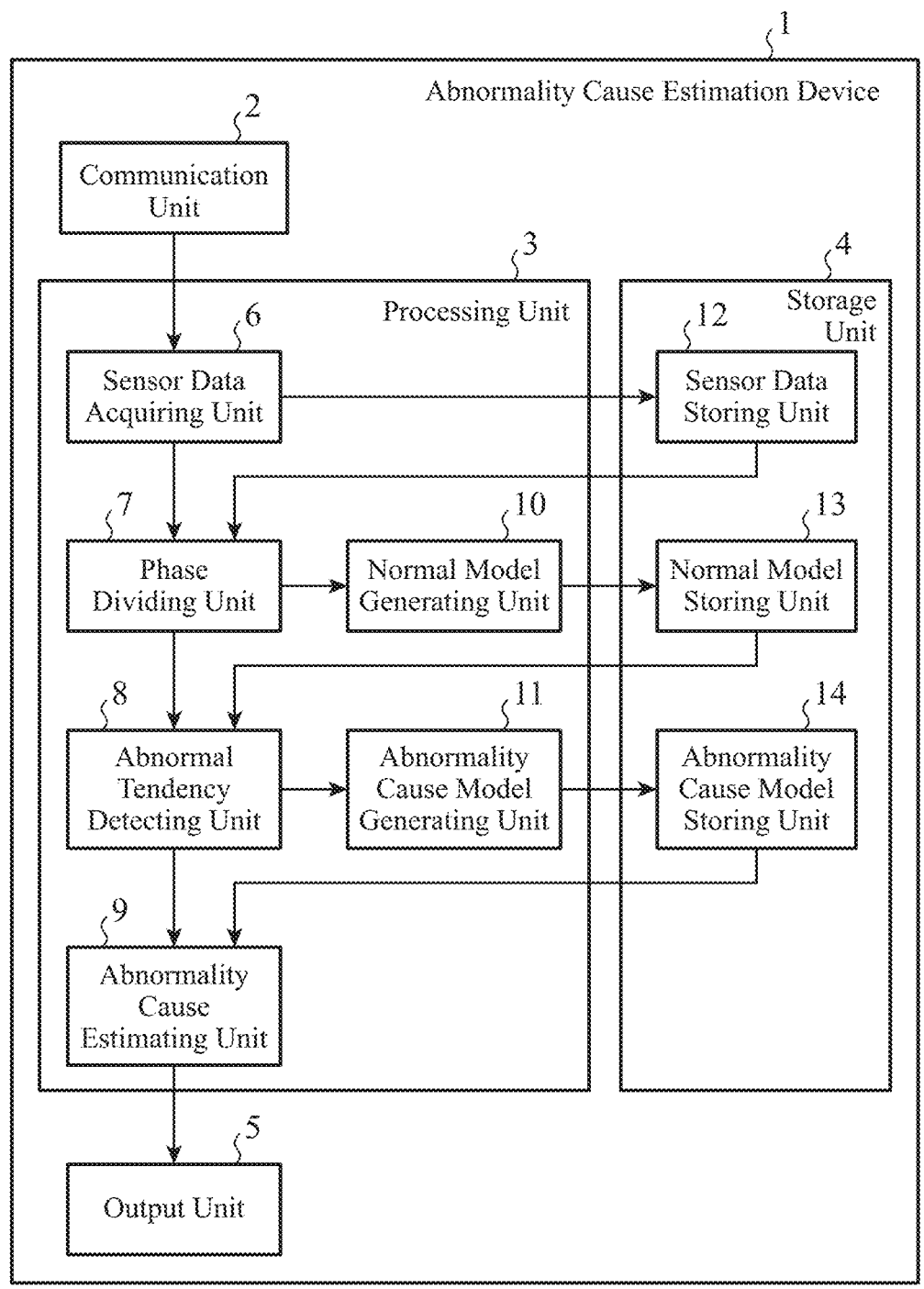
FIG. 1 is a block diagram showing a configuration of an abnormality cause estimation device according to a first embodiment.

FIG. 1 is a block diagram showing a configuration of an abnormality cause estimation device 1 according to the first embodiment. As shown in FIG. 1, the abnormality cause estimation device 1 includes a communication unit 2, a processing unit 3, a storage unit 4, and an output unit 5. The processing unit 3 includes a sensor data acquiring unit 6, a phase dividing unit 7, an abnormal tendency detecting unit 8, an abnormality cause estimating unit 9, a normal model generating unit 10, and an abnormality cause model generating unit 11. The storage unit 4 includes a sensor data storing unit 12, a normal model storing unit 13, and an abnormality cause model storing unit 14.

The communication unit 2 receives sensor data from a sensor installed in a target device (not shown). The communication unit 2 may further receive set values related to the operation of the target device, OK/NG determination information indicating whether or not the target device has operated correctly, and the like from the target device. The communication unit 2 outputs the received sensor data to the sensor data acquiring unit 6. Note that, in the present application, the device for which the abnormality cause estimation device 1 estimates the abnormality cause is referred to as "target device". Examples of the target device include plant equipment, manufacturing equipment, elevators, air conditioners, and the like.

The sensor data acquiring unit 6 acquires sensor data from the communication unit 2. The sensor data acquiring unit 6 outputs the acquired sensor data to the phase dividing unit 7, or stores the acquired sensor data in the sensor data storing unit 12. Examples of sensor data items include air temperature, humidity, vibration, rotation speed, current, voltage, and the like. The sensor data acquiring unit 6 may collect sensor data and classify the collected sensor data for each of these items.

The phase dividing unit 7 acquires the sensor data from the sensor data acquiring unit 6, or reads out the sensor data from the sensor data storing unit 12, and generates divided sensor data by dividing the acquired or read sensor data for each phase. The phase dividing unit 7 outputs the generated divided sensor data to the abnormal tendency detecting unit 8 or the normal model generating unit 10. The phase dividing unit 7 may store the generated divided sensor data in the storage unit 4. Examples of the phase include a phase in which the value of the sensor data is distinguished by the operation setting of the target device, a phase in which the value of the sensor data is distinguished by the characteristics of the waveform of the sensor data, and the like. More specifically, examples of the phase include a phase of parts pickup by a robot, a phase of fitting parts by the robot, a phase of arm extension operation, a phase of arm contraction operation, a phase of arm rotation operation, and a phase of ascending waveform, a phase of descending waveform, and the like. When thus dividing the sensor data for each phase, the phase dividing unit 7 may refer to the set value related to the operation of the target device, the characteristics of the operation of the target device, and the like.

The abnormal tendency detecting unit 8 reads out a normal model indicating a normal value range of the sensor data from the normal model storing unit 13, and detects an abnormal tendency of the sensor data by comparing the sensor data acquired by the sensor data acquiring unit 6 with the normal model. More specifically, the abnormal tendency detecting unit 8 detects the abnormal tendency of the divided sensor data by comparing the divided sensor data divided by the phase dividing unit 7 with the normal model corresponding to the phase of the divided sensor data. The abnormal tendency detecting unit 8 may read out the divided sensor data used for comparison from the storage unit 4 when detecting the abnormal tendency of the divided sensor data. The abnormal tendency detecting unit 8 generates a data set in which the detected abnormal tendency is associated with the phase of the divided sensor data used for detection, and outputs the data set to the abnormality cause estimating unit 9 or the abnormality cause model generating unit 11. The abnormal tendency detecting unit 8 may store the data set in the storage unit 4. In the present application, the abnormal tendency of the sensor data means how the value of the sensor data deviates from the normal value range of the sensor data. Thus, the abnormal tendency of the sensor data can indicate not only the index of being high or low with respect to the normal value range, but also the degree of difference between the value of the sensor data and the value in the normal value range. In addition, the abnormal tendency of sensor data can indicate the difference between the waveform of the sensor data and the waveform in the normal value range in a predetermined period. More specifically, examples of the abnormal tendency of the sensor data include: the value is high with respect to the normal value range, the value is much higher with respect to the normal value range, the value is low with respect to the normal value range, the value is much lower with respect to the normal value range, vibration increases having values more than the average values of the upper limit value and the lower limit value in the normal value range, and pulse shape having values more than the average values of the upper limit value and the lower limit value in the normal value range. For example, the abnormal tendency of the sensor data may be numerical values of these abnormal tendencies. Details of the normal model will be described later.

The abnormality cause estimating unit 9 reads out the abnormality cause model in which the abnormal tendency of the past sensor data and the abnormality cause of the target device are associated with each other from the abnormality cause model storing unit 14, and estimates the abnormality cause of the target device by comparing the abnormal tendency detected by the abnormal tendency detecting unit 8 with the abnormality cause model. More specifically, the abnormality cause estimating unit 9 estimates the abnormality cause of the target device by comparing a data set in which a phase of the divided sensor data used by the abnormal tendency detecting unit 8 for detection and the abnormal tendency detected by the abnormal tendency detecting unit 8 are associated with each other, with the abnormality cause model in which the same phase as the phase, the abnormal tendency of the past sensor data, and the abnormality cause of the target device are associated with each other. The abnormality cause estimating unit 9, when estimating the abnormality cause of the target device, may read out the abnormal tendency used for comparison from the storage unit 4. The abnormality cause estimating unit 9 outputs the estimated abnormality cause to the output unit 5. The abnormality cause estimating unit 9 may store the estimated abnormality cause in the storage unit 4. Note that, in the present application, the abnormality cause of the target device means a cause that is the basis of the occurrence of an abnormality such as a failure or malfunction in the target device. More specifically, examples of abnormality cause of the target device include a defect of a specific set value related to a specific operation of the target device, a failure of a specific facility in the target device, and the like. The abnormality cause of the target device may be a code indicating such information. In that case, the abnormality cause model storing unit 14 may store a table in which the code and the information of the abnormality cause indicated by the code are associated with each other. The details of the abnormality cause model will be described later.

The output unit 5 outputs the abnormality cause estimated by the abnormality cause estimating unit 9. The output unit 5 may further output the abnormal tendency detected by the abnormal tendency detecting unit 8. An example of the output unit 5 is a display that displays an abnormality cause of the target device.

The normal model generating unit 10 generates a normal model indicating a normal value range of the sensor data on the basis of the sensor data acquired by the sensor data acquiring unit 6. More specifically, the normal model generating unit 10 generates a normal model corresponding to the phase of the divided sensor data on the basis of the divided sensor data generated by the phase dividing unit 7. The normal model generating unit 10 stores the generated normal model in the normal model storing unit 13. Details of the normal model will be described later.

The abnormality cause model generating unit 11 generates the abnormality cause model in which the abnormal tendency of the past sensor data and the abnormality cause of the target device are associated with each other by associating the abnormal tendency detected by the abnormal tendency detecting unit 8 with the abnormality cause of the target device. More specifically, the abnormality cause model generating unit 11 generates an abnormality cause model by associating the phase of the divided sensor data used by the abnormal tendency detecting unit 8 for detection, the abnormal tendency detected by the abnormal tendency detecting unit 8, and the abnormality cause of the target device with each other. The abnormality cause model generating unit 11 stores the generated abnormality cause model in the abnormality cause model storing unit 14. The abnormality cause model generating unit 11, when thus generating the abnormality cause model, may estimate the abnormality cause of the target device from the phase of the divided sensor data used by the abnormal tendency detecting unit 8 for detection and the abnormal tendency detected by the abnormal tendency detecting unit 8. Alternatively, a user of the abnormality cause estimation device 1 may preliminarily input the abnormality cause corresponding to the phase of the divided sensor data used by the abnormal tendency detecting unit 8 for detection and the abnormal tendency detected by the abnormal tendency detecting unit 8 to the abnormality cause model generating unit 11 so that the abnormality cause model generating unit 11 can generate the abnormality cause model. The details of the abnormality cause model will be described later.

Next, the operation of the abnormality cause estimation device 1 according to the first embodiment will be described by referring to the drawings.

Figure 2:
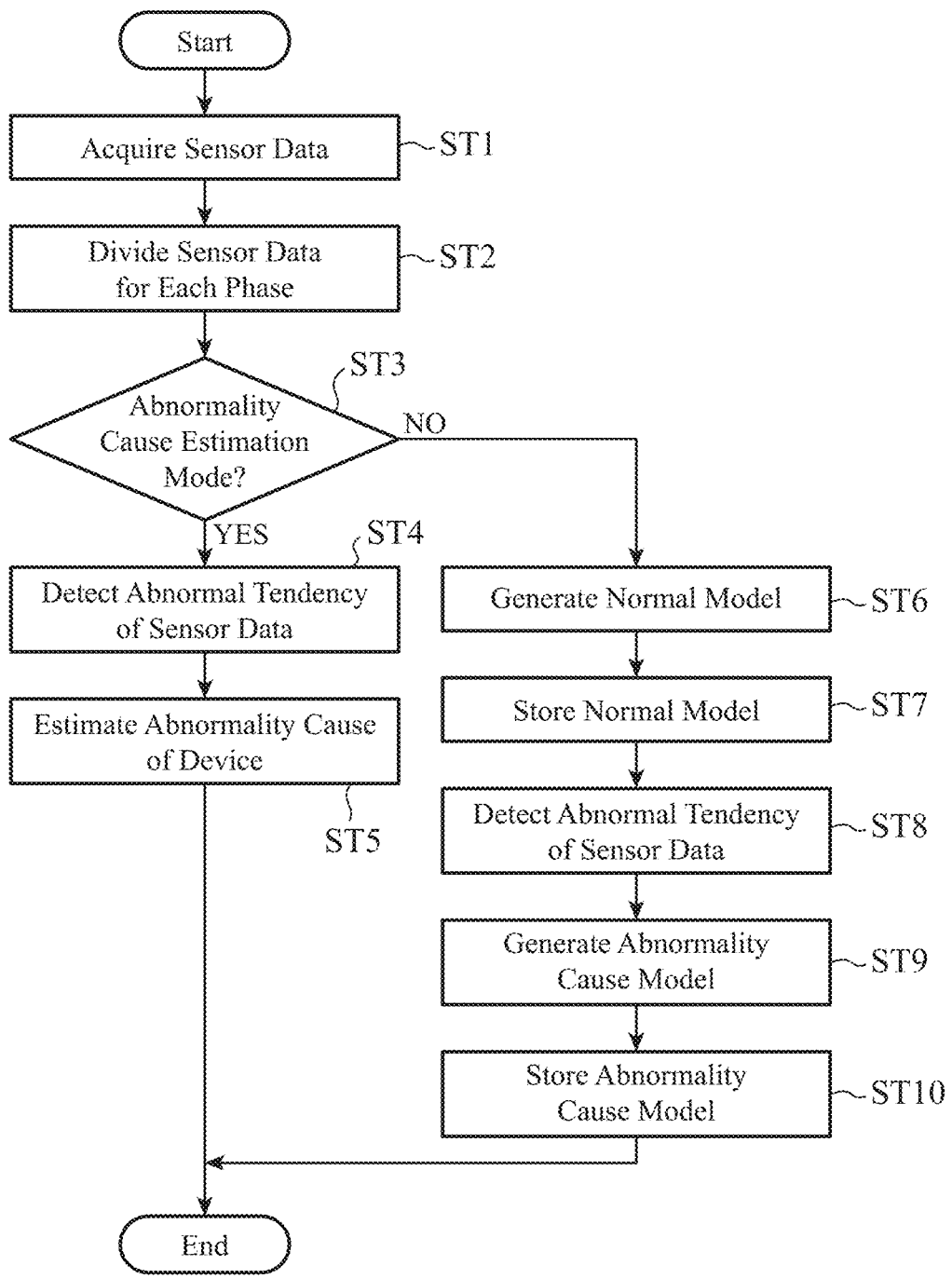
FIG. 2 is a flowchart showing an abnormality cause estimation method according to the first embodiment.

FIG. 2 is a flowchart showing an abnormality cause estimation method by the abnormality cause estimation device 1 according to the first embodiment.

As shown in FIG. 2, the sensor data acquiring unit 6 acquires sensor data from the communication unit 2 (step ST1). The sensor data acquiring unit 6 outputs the acquired sensor data to the phase dividing unit 7 or the storage unit 4.

Next, the phase dividing unit 7 acquires the sensor data from the sensor data acquiring unit 6, or reads out the sensor data from the storage unit 4, and generates the divided sensor data by dividing the acquired or read sensor data for each phase (step ST2). The phase dividing unit 7 outputs the generated divided sensor data to the abnormal tendency detecting unit 8. Note that, in the present embodiment, the configuration in which the phase dividing unit 7 executes step ST2 will be described. However, the phase dividing unit 7 may not execute step ST2, and the abnormality cause estimation device 1 may proceed to step ST3.

Next, the phase dividing unit 7 determines whether or not the current operation mode of the abnormality cause estimation device 1 is an abnormality cause estimating mode for estimating the abnormality cause of the target device (step ST3). When the phase dividing unit 7 determines that the current operation mode is the abnormality cause estimating mode (YES in step ST3), the abnormality cause estimation device 1 proceeds to step ST4. When the phase dividing unit 7 determines that the current operation mode is not the abnormality cause estimating mode (NO in step ST3), the abnormality cause estimation device 1 assumes that the current operation mode is the normal model and the abnormality cause model generating mode, and proceeds to step ST6. The current operation mode of the abnormality cause estimation device 1 in step ST3 may be set in advance automatically by the abnormality cause estimation device 1 or may be set by the user in advance, when it is necessary to estimate the abnormality cause, or when it is necessary to generate or update the normal model and the abnormality cause model.

In step ST4, the abnormal tendency detecting unit 8 reads out the normal model corresponding to the phase of the divided sensor data divided by the phase dividing unit 7 from the normal model storing unit 13, and detects the abnormal tendency of the divided sensor data by comparing the divided sensor data with the normal model. The abnormal tendency detecting unit 8 generates a data set in which the phase of the divided sensor data used for detecting the abnormal tendency and the abnormal tendency of the divided sensor data are associated with each other, and outputs the data set to the abnormality cause estimating unit 9. Note that, when the phase dividing unit 7 does not execute the above-mentioned step ST2, the abnormal tendency detecting unit 8 reads out the normal model from the normal model storing unit 13 in step ST4, and detects an abnormal tendency of the sensor data by comparing the sensor data acquired by the sensor data acquiring unit 6 with the normal model.

Next, the abnormality cause estimating unit 9 reads out the abnormality cause model in which the phase of the past sensor data, the abnormal tendency of the past sensor data, and the abnormality cause of the target device are associated with each other from the abnormality cause model storing unit 14, and estimates the abnormality cause of the target device by comparing the data set of the phase of the divided sensor data used by the abnormal tendency detecting unit 8 for detection and the abnormal tendency detected by the abnormal tendency detecting unit 8 with the abnormality cause model (step ST5). The abnormality cause estimating unit 9 outputs the estimated abnormality cause to the output unit 5, and the output unit 5 outputs the abnormality cause. In step ST5, the abnormality cause estimating unit 9, even when there is only one set of data set of the phase of the input divided sensor data and the abnormal tendency, can estimate the abnormality cause of the target device by comparing the data set with the abnormality cause model. Note that, when the phase dividing unit 7 does not execute the above-mentioned step ST2, the abnormality cause estimating unit 9, in step ST5, reads out the abnormality cause model in which the abnormal tendency of the past sensor data and the abnormality cause of the target device are associated with each other from the abnormality cause model storing unit 14, and estimates the abnormality cause of the target device by comparing the abnormal tendency detected by the abnormal tendency detecting unit 8 with the abnormality cause model.

Note that, by performing the above processes from step ST1 to step ST5, the abnormality cause estimation device 1 can sequentially execute the abnormality cause estimation on the basis of the sensor data measured by the sensor in real time while the target device is in operation.

On the other hand, in step ST6, the normal model generating unit 10 generates a normal model corresponding to the phase of the divided sensor data on the basis of the divided sensor data generated by the phase dividing unit 7. In step ST6, the normal model generating unit 10 may read out the divided sensor data generated in advance by the phase dividing unit 7 and stored in the storage unit 4 from the storage unit 4, and generate a normal model on the basis of the divided sensor data.

Next, the normal model generating unit 10 stores the generated normal model in the normal model storing unit 13 (step ST7). For example, the normal model generating unit 10, when storing the generated normal model in the normal model storing unit 13, if the past normal model generated last time is stored in the normal model storing unit 13, deletes the past normal model. Alternatively, the normal model generating unit 10 does not have to delete the past normal model in order that it can be rollbacked in case the normal model is generated by mistakenly using the invalid divided sensor data. The normal model stored in the normal model storing unit 13 by the normal model generating unit 10 is used by the abnormal tendency detecting unit 8 in the next step ST8, and later, when the abnormality cause estimation method is executed again from the above-mentioned step ST1, is used by the abnormal tendency detecting unit 8 in step ST4 described above.

Next, the abnormal tendency detecting unit 8 reads out the normal model corresponding to the phase of the divided sensor data divided by the phase dividing unit 7 from the normal model storing unit 13, and detects the abnormal tendency of the divided sensor data by comparing the divided sensor data divided by the phase dividing unit 7 with the normal model (step ST8). The abnormal tendency detecting unit 8 generates a data set in which the phase of the divided sensor data and the abnormal tendency of the divided sensor data are associated with each other, and outputs the data set to the abnormality cause model generating unit 11. In step ST8, the abnormal tendency detecting unit 8 may generate a data set in which the phase of the divided sensor data and the abnormal tendency of the divided sensor data are associated with each other, and store the data set in the storage unit 4.

Next, the abnormality cause model generating unit 11 generates the abnormality cause model by associating the phase of the divided sensor data used by the abnormal tendency detecting unit 8 for detecting the abnormal tendency in step ST8, the abnormal tendency detected by the abnormal tendency detecting unit 8, and the abnormality cause of the target device with each other (step ST9). The abnormality cause model generating unit 11 may read out the phase of the divided sensor data stored in the storage unit 4 in advance by the abnormal tendency detecting unit 8 and the abnormal tendency of the divided sensor data from the storage unit 4, and generate an abnormality cause model by associating the phase, the abnormal tendency, and the abnormality cause of the target device with each other.

Next, the abnormality cause model generating unit 11 stores the generated abnormality cause model in the abnormality cause model storing unit 14 (step ST10). For example, the abnormality cause model generating unit 11, when storing the generated abnormality cause model in the abnormality cause model storing unit 14, if the past abnormality cause model generated last time is stored in the abnormality cause model storing unit 14, deletes the past abnormality cause model. Alternatively, the normal model generating unit 10 does not have to delete the past abnormality cause model in order that it can be rollbacked in case the abnormality cause model is generated by using the abnormal tendency based on the invalid divided sensor data. The abnormality cause model stored in the abnormality cause model storing unit 14 by the abnormality cause model generating unit 11 is later used by the abnormality cause estimating unit 9 in the above-mentioned step ST5 when the abnormality cause estimation method is executed again from the above-mentioned step ST1.

Note that, in the present embodiment, in step ST6 to step ST10 described above, the abnormality cause estimation device 1 generates a normal model and an abnormality cause model and stores them in the storage unit 4, but the configuration is not limited to this. For example, the abnormality cause estimation device 1 may generate one of a normal model and an abnormality cause model, and store the generated model in the storage unit 4. In that case, when the phase dividing unit 7 determines in step ST3 described above that the current operation mode is not the abnormality cause estimating mode, the abnormality cause estimation device 1 may determine that the current operation mode is the normal model generating mode, and execute the above-mentioned step ST6 and step ST7 and do not have to execute step ST8 to step ST10. Alternatively, when the phase dividing unit 7 determines in step ST3 described above that the current operation mode is not the abnormality cause estimating mode, the abnormality cause estimation device 1 may determine that the current operation mode is the abnormality cause model generating mode, and execute the above-mentioned step ST8 to step ST10 and do not have to execute step ST6 and step ST7.

In another example, after step ST4 described above, the abnormality cause model generating unit 11 may generate an abnormality cause model by associating the phase of the divided sensor data used by the abnormal tendency detecting unit 8 for detecting the abnormal tendency in step ST4, the abnormal tendency detected by the abnormal tendency detecting unit 8 in step ST4, and the abnormality cause of the target device with each other. In that case, when the phase dividing unit 7 determines in step ST3 described above that the current operation mode is not the abnormality cause estimating mode, the abnormality cause estimation device 1 may determine that the current operation mode is the normal model generating mode, and execute the above-mentioned step ST6 and step ST7 and do not have to execute step ST8 to step ST10.

Next, a specific example of the abnormality cause estimation method by the abnormality cause estimation device 1 according to the first embodiment will be described by referring to the drawings.

FIG. 3 is a table for explaining the sensor data acquired by the sensor data acquiring unit 6 in step ST1 described above. As shown in FIG. 3, the data items of the sensor data in the example are air temperature, vibration, rotation speed, contact 1 current, contact 1 voltage, contact 2 current, and contact 2 voltage for each measured time. For example, the sensor data acquiring unit 6 classifies the sensor data acquired from the communication unit 2 into these data items for each acquired time. The data items of the sensor data are not limited to the above example, and may be data items other than these data items. In that case, the sensor data acquiring unit 6 may newly provide data items depending on the type of sensor installed in the actual target device. When the abnormality cause estimation device 1 estimates each abnormality cause of a plurality of target devices, the sensor data acquiring unit 6 may acquire sensor data from the plurality of target devices and generate a table of sensor data for each target device. Further, in that case, the sensor data acquiring unit 6 may include the data of the data items common to each target device such as air temperature and humidity not in the table of sensor data for each target device, but in another table common to the target devices. The sensor data acquiring unit 6 outputs the generated table to the phase dividing unit 7, or stores it in the sensor data storing unit 12.

Figure 4:
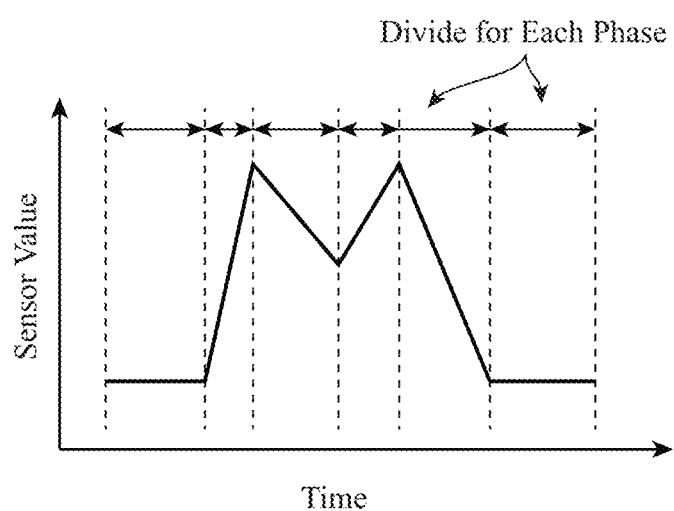
FIG. 4 is a graph for explaining an example of a process in which the abnormality cause estimation device according to the first embodiment divides sensor data for each phase.

FIG. 4 is a graph for explaining an example of a process in which the phase dividing unit 7 divides the sensor data for each phase in the above-mentioned step ST2. In FIG. 4, the vertical axis represents the sensor value, which is any value indicated by the sensor data, and the horizontal axis represents time. The sensor values in the graph shown in FIG. 4 indicate the sensor values measured by the sensor installed in the target device when the target device executes one sequence. The sensor values are divided into six phases depending on the shape of the waveform. Note that, it is assumed that the target device repeatedly executes such a sequence.

For example, in step ST2 described above, the phase dividing unit 7 generates divided sensor data by dividing the sensor values that change with one sequence by the target device for each phase that is distinguished by the characteristics of the waveform of the sensor values. For example, when the arm of the robot on which the sensor is installed performs two operations of picking up parts and fitting parts in one sequence, the phase dividing unit 7 may detect the characteristics of the waveform of the sensor values associated with the two operations, and divide the sensor values for each phase corresponding to each of the two operations. For example, the phase dividing unit 7 may divide the sensor values for each phase corresponding to each of operations such as expansion, contraction, and rotation according to the movement characteristics of the arm of the robot on which the sensor is installed. For example, the phase dividing unit 7 may acquire a signal of a set value related to the operation of the target device and divide the sensor values for each phase on the basis of the set value. Alternatively, for example, the phase dividing unit 7 may divide the sensor values for each phase on the basis of a machine learning method such as a method of detecting a change point from the characteristics of data.

FIGS. 5A and 5B are each a graph for explaining an example of a normal model generated by the normal model generating unit 10 in the above-mentioned step ST6 and used by the abnormal tendency detecting unit 8 in the above-mentioned step ST4 and step ST8. In FIGS. 5A and 5B, the vertical axis represents the sensor value and the horizontal axis represents time. FIG. 5A is a graph obtained by plotting, at the same coordinates, line graphs of the divided sensor data in one phase corresponding to each trial of the specific sequence on the basis of the sensor values measured by the sensor installed in the target device when the target device repeatedly executes the specific sequence. For example, the normal model generating unit 10 acquires a plurality of line graphs shown in FIG. 5A in step ST6 described above, compares the plurality of line graphs with each other, and calculates the variation of the sensor values for each time.

Next, the normal model generating unit 10 generates a band model shown in FIG. 5B as a normal model on the basis of the variation. More specifically, for example, the normal model generating unit 10 calculates the mean value and standard deviation of the sensor values for each time, and calculates the normal value range as shown by the shaded portion in FIG. 5B on the basis of the mean value and standard deviation. More specifically, for example, the normal value range is a normal value range for each time in which a value obtained by multiplying the standard deviation for each time by a predetermined multiple is added to the average value for each time as the upper limit value and the value subtracted from the average value as the lower limit value. For example, the normal model generating unit 10, as shown in FIG. 5B at time $t_1$, calculates the range equal to or more than $M(t_1)-W(t_1)$ and equal to or less than $M(t_1)+W(t_1)$ as the normal value range of time $t_1$ on the basis of the mean value $M(t_1)$ of the sensor values and the standard deviation $W(t_1)$ of the sensor values.

The method in which the normal model generating unit 10 generates a normal model in step ST6 described above is not limited to the above example. Another example of such a method is a machine learning method such as One Class SVM, principal component analysis, and neural network.

Further, the abnormal tendency detecting unit 8 detects an abnormal tendency of divided sensor data by comparing the divided sensor data divided by the phase dividing unit 7 with the normal model previously generated by the normal model generating unit 10 as described above in the above-mentioned step ST4 and step ST8. For example, in the above-mentioned step ST4 and step ST8, the abnormal tendency detecting unit 8 detects the abnormal tendency when the sensor values of the divided sensor data deviate from the normal value range calculated as described above.

FIG. 6 is a table for explaining an example of the abnormality cause model generated by the abnormality cause model generating unit 11 in the above-mentioned step ST9 and used by the abnormality cause estimating unit 9 in the above-mentioned step ST5. As shown in FIG. 6, the abnormality cause model generating unit 11, in the above-mentioned step ST9, generates a table of the abnormality cause model by associating a "phase" of the divided sensor data used by the abnormal tendency detecting unit 8 for detecting the abnormal tendency in step ST8 described above, a "detected signal" indicating an identification name of the divided sensor data in which the abnormal tendency detecting unit 8 has detected the abnormal tendency in step ST8 described above, an "abnormal tendency" detected by the abnormal tendency detecting unit 8 in step ST8 described above, and an "abnormality cause" of the target device with each other. More specifically, as shown in FIG. 6, in the above-mentioned step ST9, the abnormality cause model generating unit 11 associates a "start" as the phase, a "signal 1" as a detected signal, "excessive" as the abnormal tendency, and a "setting failure" as the abnormality cause with each other. Further, in the above-mentioned step ST9, the abnormality cause model generating unit 11 further associates "steady" as the phase, a "signal 2" as the detected signal, a "vibration" as the abnormal tendency, and an "equipment failure" as the abnormality cause with each other. The abnormality cause model generating unit 11 may associate information other than the data related to the abnormality of the target device, such as the above items. For example, the abnormality cause model generating unit 11 may separately perform FTA (Fault Tree Analysis) for the combination of the abnormal tendency and the abnormality cause, and associate the result of the FTA (Fault Tree Analysis) with the abnormal tendency and the abnormality cause.

Figure 7:
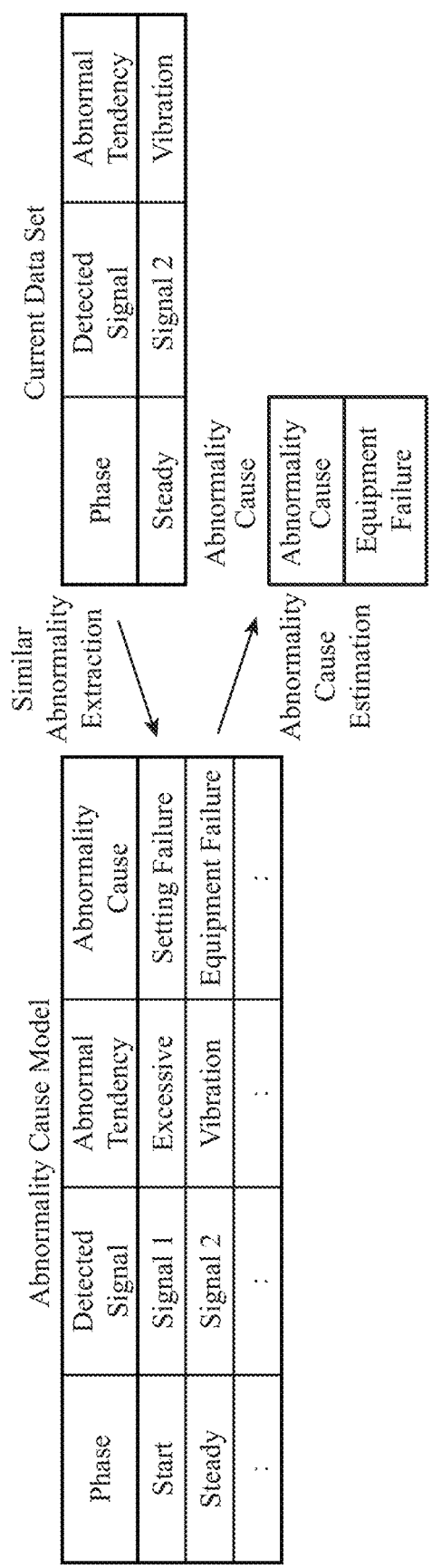
FIG. 7 is a diagram for explaining an example of a process in which the abnormality cause estimation device according to the first embodiment estimates an abnormality cause of the target device.

FIG. 7 is a diagram for explaining an example of a process in which the abnormality cause estimating unit 9 estimates the abnormality cause of the target device in step ST5 described above. As shown in FIG. 7, the abnormality cause estimating unit 9, in the above-mentioned step ST5, estimates the abnormality cause of the target device by comparing a table of the current data set in which the "phase" of the divided sensor data used by the abnormal tendency detecting unit 8 for detecting the abnormal tendency in the above-mentioned step ST4, the "detected signal" indicating the identification name of the divided sensor data in which the abnormal tendency detecting unit 8 has detected the abnormal tendency in step ST4 described above, and the "abnormal tendency" detected by the abnormal tendency detecting unit 8 in step ST4 described above are associated with each other, with a table of the abnormality cause model in which the phase of the past divided sensor data, the detected signal, the abnormal tendency, and the abnormality cause are associated with each other.

More specifically, as shown in FIG. 7, in the table of the current data set used by the abnormality cause estimating unit 9 for estimating the abnormality cause of the target device in step ST5 described above, the item of phase of the divided sensor data indicates "steady", the item of detected signal indicates the "signal 2", and the item of abnormal tendency indicates "vibration". Further, the table of the abnormality cause model used by the abnormality cause estimating unit 9 for estimating the abnormality cause of the target device in step ST5 described above includes a first row in which the item of phase indicates "start", the item of detected signal indicates the "signal 1", the item of abnormal tendency indicates "excessive", and the item of abnormality cause indicates the "setting failure", and a second row in which the item of phase indicates "steady", the item of detected signal indicates the "signal 2", the item of abnormal tendency indicates the "vibration", and the item of abnormality cause indicates the "equipment failure". The abnormality cause estimating unit 9 compares the current data set with the abnormality cause model, and determines that the current data set and the second row of the table of the abnormality cause model match in the item of phase, the item of detected signal, and the item of abnormal tendency. On the basis of the determination, the abnormality cause estimating unit 9 estimates the "equipment failure" indicated by the item of abnormality cause included in the second row of the table of the abnormality cause model to be the abnormality cause of the target device.

As in the above example, the abnormality cause estimating unit 9, when determining that the table of the current data set and a specific row in the table of the abnormality cause model match in all the items included in the current data set, estimates the abnormality cause included in the specific row in the table of the abnormality cause model to be the abnormality cause of the target device. Alternatively, the abnormality cause estimating unit 9, when comparing the table of the current data set with all the rows included in the table of the abnormality cause model to determine that the current data set and a plurality of rows included in the table of the abnormality cause model match in some items of the current data set, may extract the plurality of rows as row candidates in the table of the abnormality cause model indicating the abnormality cause of the target device. In that case, the abnormality cause estimating unit 9 may calculate the similarity with the current data set by performing general text analysis or the like on the extracted candidates, and estimate the abnormality cause indicated by the candidate with the highest similarity to be an abnormality cause of the target device.

An example of the use of the abnormality cause estimation device 1 according to the first embodiment described above is the use of estimating the abnormality cause of the manufacturing equipment. Even if products are manufactured using the same equipment with the same set values, an abnormality such as a failure or malfunction may occur in the manufacturing equipment due to changes in the external environment such as air temperature or humidity, or changes over time due to wear of the manufacturing equipment. In such a case, the abnormality cause cannot be identified from the set value alone. Thus, by using the abnormality cause estimation device 1, it is possible to estimate the abnormality cause by dividing the sensor data for each phase, detecting the abnormal tendency of the divided sensor data after the division, comparing the abnormal tendency and the phase with the abnormal tendency and the phase indicated by the abnormality cause model, and extracting similar abnormal tendency and phase.

As described above, the abnormality cause estimation device 1 according to the first embodiment includes the sensor data acquiring unit 6 for acquiring sensor data from a sensor installed in a target device, the abnormal tendency detecting unit 8 for detecting an abnormal tendency of the sensor data by comparing the sensor data acquired by the sensor data acquiring unit 6 with a normal model showing a normal value range of the sensor data, and the abnormality cause estimating unit 9 for estimating an abnormality cause of the target device by comparing the abnormal tendency detected by the abnormal tendency detecting unit 8 with an abnormality cause model in which an abnormal tendency of past sensor data and an abnormality cause of the target device are associated with each other.

According to the above configuration, the abnormality cause of the target device is estimated by detecting the abnormal tendency of the sensor data and comparing the abnormal tendency with the abnormality cause model. As a result, since the abnormality cause can be estimated with higher accuracy depending on the abnormal tendency of the sensor data than the threshold value determination in which only the determination result of whether or not the sensor data exceeds the threshold value can be obtained, it is possible to identify the abnormality cause rather than estimating the abnormality cause by the threshold value determination.

The abnormality cause estimation device 1 according to the first embodiment further includes the phase dividing unit 7 for generating divided sensor data by dividing the sensor data acquired by the sensor data acquiring unit 6 for each phase, the abnormal tendency detecting unit 8 detects the abnormal tendency of the divided sensor data by comparing the divided sensor data generated by the phase dividing unit 7 with the normal model corresponding to the phase of the divided sensor data, and the abnormality cause estimating unit 9 estimates the abnormality cause of the target device by comparing a phase of the divided sensor data and the abnormal tendency detected by the abnormal tendency detecting unit 8 with the abnormality cause model in which the same phase as the phase, the abnormal tendency of the past sensor data, and the abnormality cause of the target device are associated with each other.

According to the above configuration, the phase of the divided sensor data and the phase indicated by the abnormality cause model are further compared. As a result, the abnormality cause can be estimated with higher accuracy than when the phase of the divided sensor data is not used.

The abnormality cause estimation device 1 according to the first embodiment further includes the abnormality cause model generating unit 11 for generating an abnormality cause model by associating the abnormal tendency detected by the abnormal tendency detecting unit 8 with the abnormality cause of the target device.

According to the above configuration, the abnormality cause of the target device can be estimated by comparing the generated abnormality cause model with the detected abnormal tendency. This makes it possible to identify the abnormality cause rather than estimating the abnormality cause by the threshold value determination.

The abnormality cause estimation device 1 according to the first embodiment further includes the normal model generating unit 10 for generating a normal model on the basis of the sensor data acquired by the sensor data acquiring unit 6.

According to the above configuration, the abnormal tendency of the sensor data can be detected by comparing the generated normal model with the acquired sensor data, and the abnormality cause of the target device can be estimated by comparing the abnormal tendency with the abnormality cause model. This makes it possible to identify the abnormality cause rather than estimating the abnormality cause by the threshold value determination.

Second Embodiment

In the first embodiment, the configuration has been described in which the abnormality cause estimation device 1 estimates the abnormality cause of the target device not only by comparing the abnormal tendency of the divided sensor data with the abnormal tendency indicated by the abnormality cause model, but also by further comparing the phase of the divided sensor data with the phase indicated by the abnormality cause model. In a second embodiment, a configuration will be described in which an abnormality cause estimation device 20 estimates an abnormality cause of the target device by further comparing a group of the divided sensor data with a group indicated by the abnormality cause model.

The second embodiment will be described below by referring to the drawings. Note that, the same reference numerals are given to the configurations having the same functions as those described in the first embodiment, and the description thereof will be omitted.

Figure 8:
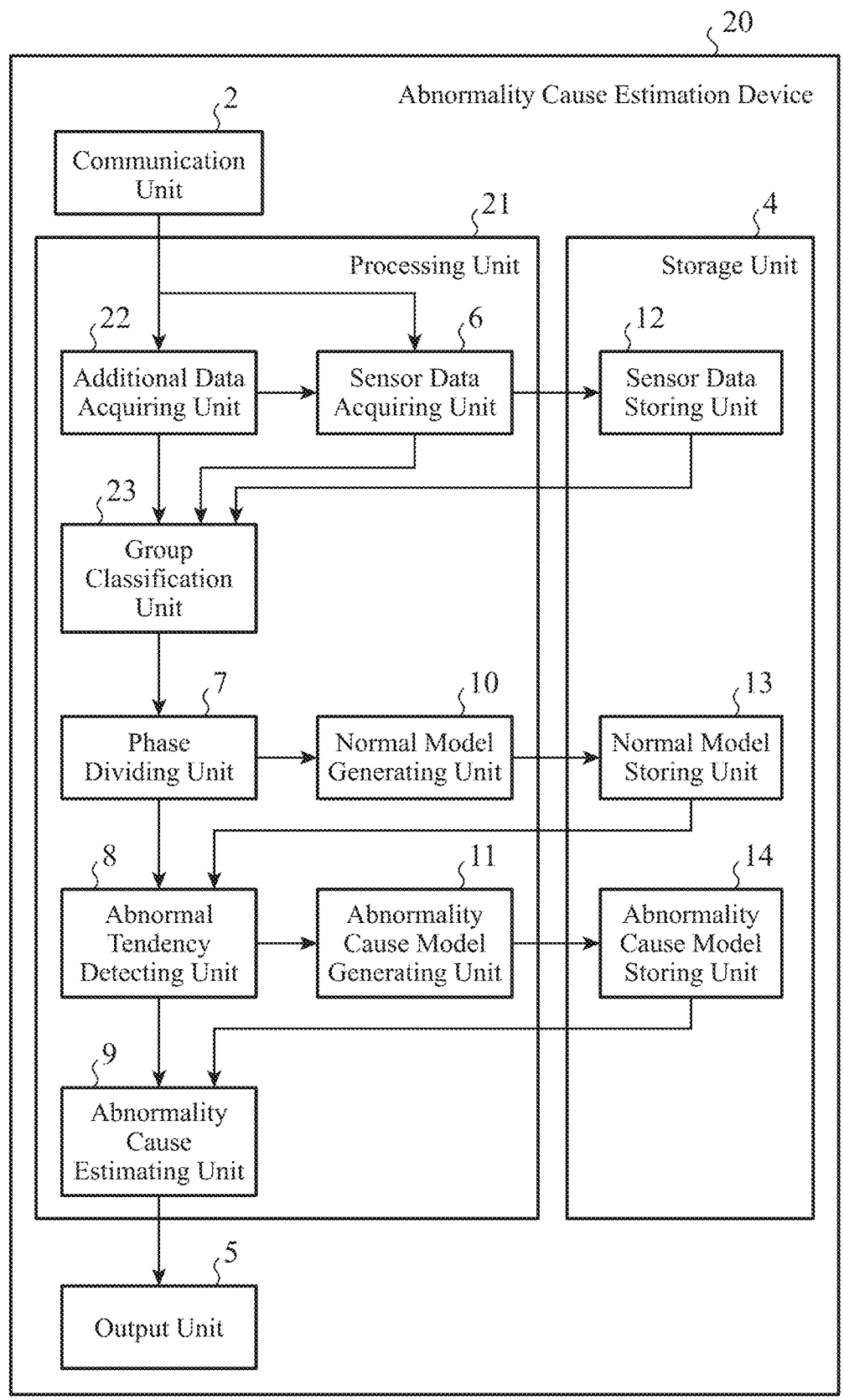
FIG. 8 is a block diagram showing a configuration of an abnormality cause estimation device according to a second embodiment.

FIG. 8 is a block diagram showing a configuration of the abnormality cause estimation device 20 according to the second embodiment. As shown in FIG. 8, in the abnormality cause estimation device 20, in addition to the configuration of the abnormality cause estimation device 1 according to the first embodiment, a processing unit 21 further includes an additional data acquiring unit 22 and a group classification unit 23.

The additional data acquiring unit 22 acquires additional data related to the target device from the target device via the communication unit 2. The additional data acquiring unit 22 outputs the acquired additional data to the group classification unit 23. For example, the additional data can include at least one or more data of a set value related to the operation of the target device, an environmental value around the target device, and information about a product manufactured by the target device. Examples of environmental values around the target device include temperature and humidity.

The group classification unit 23 acquires sensor data from the sensor data acquiring unit 6, or reads out sensor data from the storage unit 4, and classifies the acquired or read sensor data for each group according to the additional data acquired by the additional data acquiring unit 22. The group classification unit 23 outputs the classified sensor data to the phase dividing unit 7. Examples of the group include a group in which the set value related to the operation of the target device is within a predetermined range, a group in which the environmental value around the target device is within a predetermined range, a group in which the product manufactured by the target device is a specific product, and the like.

Next, the operation of the abnormality cause estimation device 20 according to the second embodiment will be described by referring to the drawings. In the description of the abnormality cause estimation device 20 according to the second embodiment, detailed description of the same process as the process of the abnormality cause estimation method described in the first embodiment will be omitted as appropriate.

Figure 9:
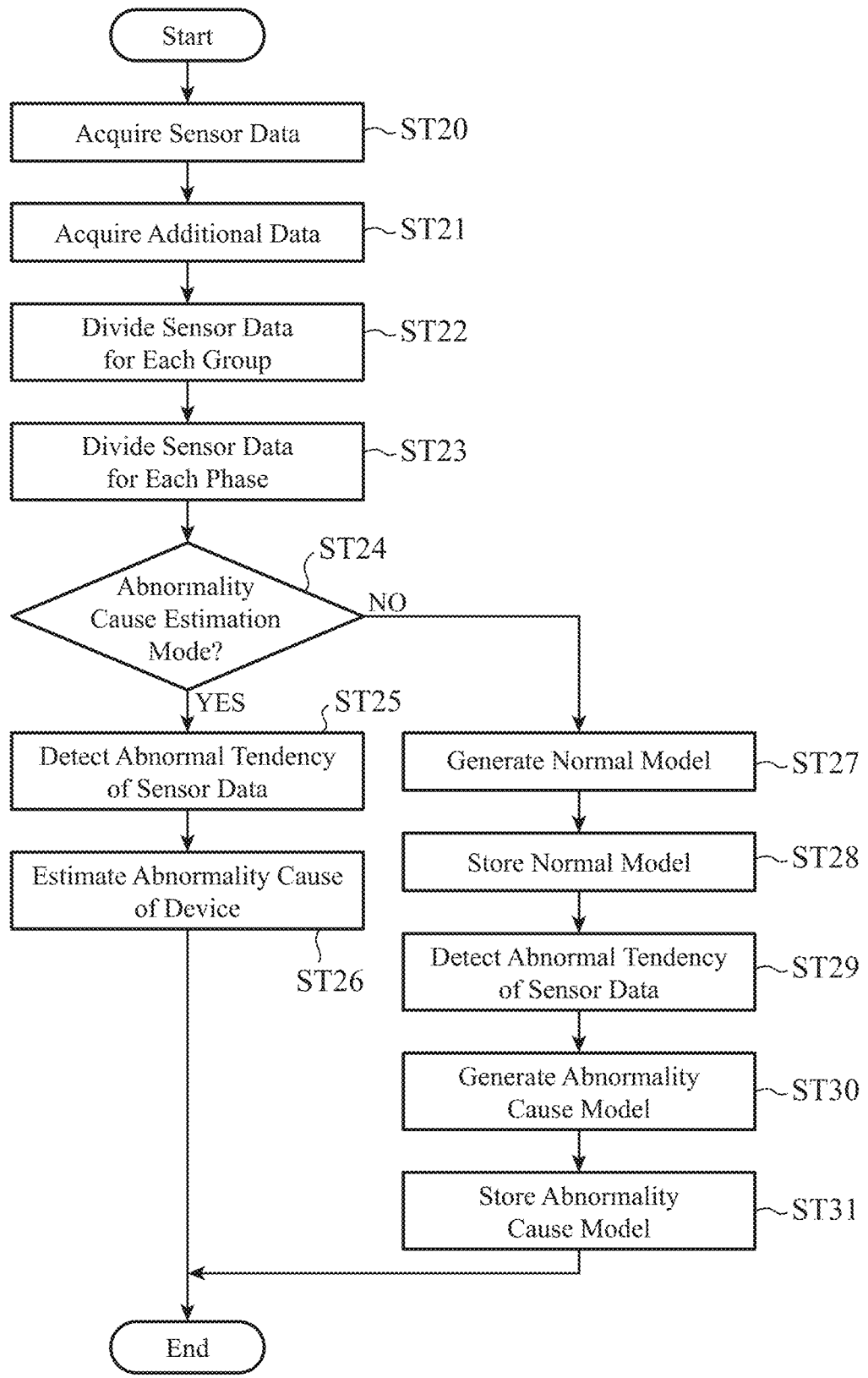
FIG. 9 is a flowchart showing an abnormality cause estimation method according to the second embodiment.

FIG. 9 is a flowchart showing an abnormality cause estimation method by the abnormality cause estimation device 20 according to the second embodiment. As shown in FIG. 9, the sensor data acquiring unit 6 acquires sensor data from the communication unit 2 (step ST20). The sensor data acquiring unit 6 outputs the acquired sensor data to the group classification unit 23 or the storage unit 4.

Next, the additional data acquiring unit 22 acquires additional data related to the target device from the target device via the communication unit 2 (step ST21).

Next, the group classification unit 23 acquires the sensor data from the sensor data acquiring unit 6, or reads out the sensor data from the storage unit 4, and classifies the acquired or read sensor data for each group according to the additional data acquired by the additional data acquiring unit 22 (step ST22). The group classification unit 23 outputs the classified sensor data to the phase dividing unit 7.

Next, the phase dividing unit 7 generates divided sensor data by dividing the sensor data classified by the group classification unit 23 for each phase (step ST23). The phase dividing unit 7 outputs the generated divided sensor data to the abnormal tendency detecting unit 8.

Next, the phase dividing unit 7 determines whether or not the current operation mode of the abnormality cause estimation device 20 is the abnormality cause estimating mode for estimating the abnormality cause of the target device (step ST24). When the phase dividing unit 7 determines that the current operation mode is the abnormality cause estimating mode (YES in step ST24), the abnormality cause estimation device 20 proceeds to step ST25. When the phase dividing unit 7 determines that the current operation mode is not the abnormality cause estimating mode (NO in step ST24), the abnormality cause estimation device 20 proceeds to step ST27.

In step ST25, the abnormal tendency detecting unit 8 reads out the normal model corresponding to the group classified by the group classification unit 23 and the phase of the divided sensor data divided by the phase dividing unit 7 from the normal model storing unit 13, and detects the abnormal tendency of the divided sensor data by comparing the divided sensor data with the normal model. The abnormal tendency detecting unit 8 generates a data set in which the phase of the divided sensor data used for detecting the abnormal tendency and the abnormal tendency of the divided sensor data are associated with each other, and outputs the data set to the abnormality cause estimating unit 9.

Next, the abnormality cause estimating unit 9 reads out the abnormality cause model in which the group of past sensor data, the phase of the past sensor data, the abnormal tendency of the past sensor data, and the abnormality cause of the target device are associated with each other from the abnormality cause model storing unit 14, and estimates the abnormality cause of the target device by comparing the data set in which the group and phase of the divided sensor data used by the abnormal tendency detecting unit 8 for detection are associated with the abnormal tendency detected by the abnormal tendency detecting unit 8, with the abnormality cause model (step ST26). The abnormality cause estimating unit 9 outputs the estimated abnormality cause to the output unit 5, and the output unit 5 outputs the abnormality cause.

On the other hand, in step ST27, the normal model generating unit 10 generates a normal model corresponding to the group and phase of the divided sensor data on the basis of the divided sensor data generated by the phase dividing unit 7.

Next, the normal model generating unit 10 stores the generated normal model in the normal model storing unit 13 (step ST28).

Next, the abnormal tendency detecting unit 8 reads out the normal model corresponding to the group and the phase of the divided sensor data divided by the phase dividing unit 7 from the normal model storing unit 13, and detects the abnormal tendency of the divided sensor data by comparing the divided sensor data with the normal model (step ST29). The abnormal tendency detecting unit 8 outputs the detected abnormal tendency to the abnormality cause model generating unit 11.

Next, the abnormality cause model generating unit 11 generates an abnormality cause model by associating the group and phase of the divided sensor data used by the abnormal tendency detecting unit 8 for detecting the abnormal tendency in step ST8, the abnormal tendency detected by the abnormal tendency detecting unit 8, and the abnormality cause of the target device with each other (step ST30).

Next, the abnormality cause model generating unit 11 stores the generated abnormality cause model in the abnormality cause model storing unit 14 (step ST31).

As described above, the abnormality cause estimation device 20 according to the second embodiment further includes the additional data acquiring unit 22 for acquiring additional data related to the target device, and the group classification unit 23 for classifying sensor data acquired by the sensor data acquiring unit 6 for each group according to the additional data acquired by the additional data acquiring unit 22, the abnormal tendency detecting unit 8 detects the abnormal tendency of the sensor data by comparing the sensor data classified by the group classification unit 23 with a normal model corresponding to the group of the sensor data, and the abnormality cause estimating unit 9 estimates the abnormality cause of the target device by comparing a group of the sensor data and the abnormal tendency detected by the abnormal tendency detecting unit 8 with the abnormality cause model in which the same group as the group, the abnormal tendency of the past sensor data, and the abnormality cause of the target device are associated with each other.

According to the above configuration, the sensor data classified on the basis of the additional data related to the target device is compared with a normal model corresponding to the group of the sensor data. As a result, since the sensor data can be compared with the normal model according to the situation of the target device, it is possible to detect the abnormal tendency of the sensor data with higher accuracy than when the sensor data is not classified by using the additional data. Further, by further comparing the sensor data group with the group indicated by the abnormality cause model, the abnormality cause can be estimated with higher accuracy than when the sensor data group is not used.

In the abnormality cause estimation device 20 according to the second embodiment, the additional data includes at least one or more data of the set value of the target device, the environmental value around the target device, and the information about the product manufactured by the target device.

According to the above configuration, since the sensor data can be compared with the normal model according to the situation of the target device based on at least one or more data of the set value of the target device, the environmental value around the target device, and the information about the product manufactured by the target device, it is possible to detect an abnormal tendency of the sensor data with higher accuracy than when the sensor data is not classified by using additional data.

The function of each of the sensor data acquiring unit 6, the phase dividing unit 7, the abnormal tendency detecting unit 8, the abnormality cause estimating unit 9, the normal model generating unit 10, and the abnormality cause model generating unit 11 in the abnormality cause estimation device 1 is implemented by a processing circuit. That is, the abnormality cause estimation device 1 includes a processing circuit for executing the processing from step ST1 to step ST10 shown in FIG. 2. Similarly, the function of each of the sensor data acquiring unit 6, the phase dividing unit 7, the abnormal tendency detecting unit 8, the abnormality cause estimating unit 9, the normal model generating unit 10, the abnormality cause model generating unit 11, the additional data acquiring unit 22, and the group classification unit 23 in the abnormality cause estimation device 20 is implemented by a processing circuit. That is, the abnormality cause estimation device 20 includes a processing circuit for executing the processing from step ST20 to step ST31 shown in FIG. 9. The processing circuit may be dedicated hardware or a central processing unit (CPU) that executes programs stored in a memory.

Figure 10A:
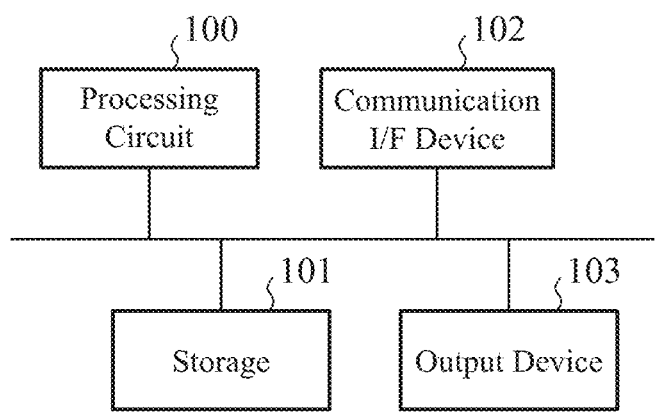
FIG. 10A is a block diagram showing a hardware configuration for implementing functions of an air-conditioning control device according to the first and second embodiments.
Figure 10B:
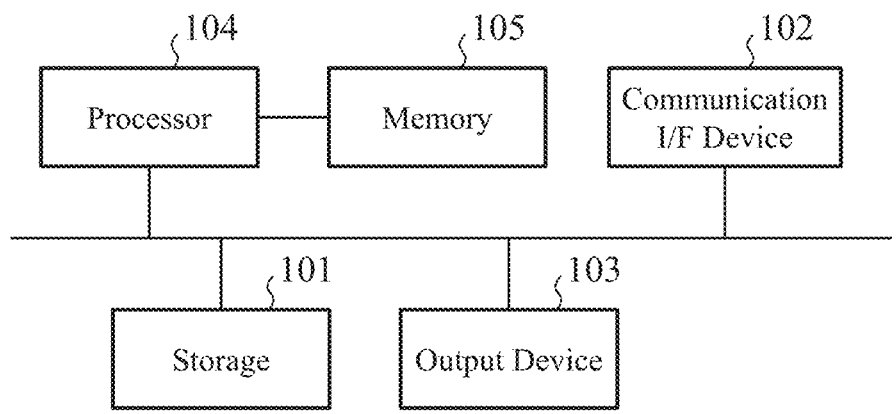
FIG. 10B is a block diagram showing a hardware configuration for executing software that implements functions of the air-conditioning control device according to the first and second embodiments.

FIG. 10A is a block diagram showing a hardware configuration for implementing the functions of the abnormality cause estimation device 1 or the abnormality cause estimation device 20. FIG. 10B is a block diagram showing a hardware configuration for executing software that implements the functions of the abnormality cause estimation device 1 or the abnormality cause estimation device 20. A storage 101 shown in FIGS. 10A and 10B has the functions of the sensor data storing unit 12, the normal model storing unit 13, and the abnormality cause model storing unit 14, and stores the sensor data, the normal model, and the abnormality cause model. Further, the storage 101 stores the abnormal tendency detected by the abnormal tendency detecting unit 8 and the abnormality cause estimated by the abnormality cause estimating unit 9. A communication I/F device 102 has the function of the communication unit 2 and receives sensor data, additional data, and the like from the target device. In addition, when the communication I/F device 102 is connected to a data server, the sensor data acquired by the sensor data acquiring unit 6, the normal model generated by the normal model generating unit 10, and the abnormality cause model generated by the abnormality cause model generating unit 11, the abnormal tendency detected by the abnormal tendency detecting unit 8, and the abnormality cause estimated by the abnormality cause estimating unit 9 may be transmitted to and stored in the data server. An output device 103 outputs the abnormal tendency detected by the abnormal tendency detecting unit 8 and the abnormality cause estimated by the abnormality cause estimating unit 9.

When the processing circuit is a processing circuit 100 of dedicated hardware shown in FIG. 10A, the processing circuit 100 corresponds, for example, to a single circuit, a composite circuit, a programmed processor, a parallel-programmed processor, an application specific integrated circuit (ASIC), a field-programmable gate array (FPGA), or a combination thereof.

The function of each of the sensor data acquiring unit 6, the phase dividing unit 7, the abnormal tendency detecting unit 8, the abnormality cause estimating unit 9, the normal model generating unit 10, and the abnormality cause model generating unit 11 in the abnormality cause estimation device 1 may be implemented by a separate processing circuit, or these functions may be collectively implemented by one processing circuit.

The function of each of the sensor data acquiring unit 6, the phase dividing unit 7, the abnormal tendency detecting unit 8, the abnormality cause estimating unit 9, the normal model generating unit 10, the abnormality cause model generating unit 11, the additional data acquiring unit 22, and the group classification unit 23 in the abnormality cause estimation device 20 may be implemented by a separate processing circuit, or these functions may be collectively implemented by one processing circuit.

When the processing circuit is a processor 104 shown in FIG. 10B, the function of each of the sensor data acquiring unit 6, the phase dividing unit 7, the abnormal tendency detecting unit 8, the abnormality cause estimating unit 9, the normal model generating unit 10, and the abnormality cause model generating unit 11 in the abnormality cause estimation device 1 is implemented by software, firmware, or a combination of software and firmware.

Further, the function of each of the sensor data acquiring unit 6, the phase dividing unit 7, the abnormal tendency detecting unit 8, the abnormality cause estimating unit 9, the normal model generating unit 10, the abnormality cause model generating unit 11, the additional data acquiring unit 22, and the group classification unit 23 in the abnormality cause estimation device 20 is also implemented by software, firmware, or a combination of software and firmware.

Note that, software or firmware is described as a program and stored in a memory 105.

By reading and executing the programs stored in the memory 105, the processor 104 implements the function of each of the sensor data acquiring unit 6, the phase dividing unit 7, the abnormal tendency detecting unit 8, the abnormality cause estimating unit 9, the normal model generating unit 10, and the abnormality cause model generating unit 11 in the abnormality cause estimation device 1. That is, the abnormality cause estimation device 1 includes the memory 105 for storing programs in which the processing from step ST1 to step ST10 shown in FIG. 2 is executed as a result when executed by the processor 104.

These programs cause a computer to execute procedures or methods of the sensor data acquiring unit 6, the phase dividing unit 7, the abnormal tendency detecting unit 8, the abnormality cause estimating unit 9, the normal model generating unit 10, and the abnormality cause model generating unit 11 in the abnormality cause estimation device 1. The memory 105 may be a computer-readable storage medium that stores programs for causing a computer to function as the sensor data acquiring unit 6, the phase dividing unit 7, the abnormal tendency detecting unit 8, the abnormality cause estimating unit 9, the normal model generating unit 10, and the abnormality cause model generating unit 11. This also applies to the abnormality cause estimation device 20.

Examples of the memory 105 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

Some of the functions of the sensor data acquiring unit 6, the phase dividing unit 7, the abnormal tendency detecting unit 8, the abnormality cause estimating unit 9, the normal model generating unit 10, and the abnormality cause model generating unit 11 may be implemented by dedicated hardware, and some of them may be implemented by software or firmware.

For example, the functions of the sensor data acquiring unit 6, the phase dividing unit 7, the abnormal tendency detecting unit 8, and the abnormality cause estimating unit 9 are implemented by a processing circuit as dedicated hardware. The functions of the normal model generating unit 10 and the abnormality cause model generating unit 11 may be implemented by the processor 104 reading and executing the programs stored in the memory 105.

The same applies to the sensor data acquiring unit 6, the phase dividing unit 7, the abnormal tendency detecting unit 8, the abnormality cause estimating unit 9, the normal model generating unit 10, the abnormality cause model generating unit 11, the additional data acquiring unit 22, and the group classification unit 23 in the abnormality cause estimation device 20.

Thus, the processing circuit can implement each of the above functions by hardware, software, firmware, or a combination thereof.

It should be noted that the invention of the present application can freely combine the embodiments, modify an arbitrary constituent element of each embodiment, or omit an arbitrary constituent element in each embodiment within the scope of the invention.

INDUSTRIAL APPLICABILITY

In the technique for estimating the abnormality cause of the target device, since the abnormality cause estimation device according to the present invention can identify the abnormality cause rather than estimating the abnormality cause by the threshold value determination, it can be applied to an abnormality cause estimation device that estimates the abnormality cause of the device.

REFERENCE SIGNS LIST

1: abnormality cause estimation device, 2: communication unit, 3: processing unit, 4: storage unit, 5: output unit, 6: sensor data acquiring unit, 7: phase dividing unit, 8: abnormal tendency detecting unit, 9: abnormality cause estimating unit, 10: normal model generating unit, 11: abnormality cause model generating unit, 12: sensor data storing unit, 13: normal model storing unit, 14: abnormality cause model storing unit, 20: abnormality cause estimation device, 21: processing unit, 22: additional data acquiring unit, 23: group classification unit, 100: processing circuit, 101: storage, 102: communication I/F device, 103: output device, 104: processor, 105: memory

The invention claimed is:

1. An abnormality cause estimation device, comprising:
processing circuitry configured to
acquire sensor data from a sensor installed in a target device;
acquire additional data related to the target device, the additional data including at least one or more data of a set value related to an operation of the target device, an environmental value around the target device, and information about a product manufactured by the target device;
classify the acquired sensor data for each group according to the acquired additional data;
detect an abnormal tendency of the sensor data by comparing the acquired sensor data with a normal model in accordance with a group of the sensor data; and
estimate an abnormality cause of the target device by comparing the group of the sensor data and the detected abnormal tendency with an abnormality cause model in which a group being identical to the group of the sensor data, the abnormal tendency of past sensor data, and the abnormality cause of the target device are associated with each other, to identify the abnormality cause of the target device without estimating the abnormality cause by threshold value determination to streamline maintenance work of the target device and predict and prevent abnormality occurrence of the target device.

2. The abnormality cause estimation device according to claim 1, wherein the processing circuitry is further configured to
generate divided sensor data by dividing the acquired sensor data for each phase;
detect an abnormal tendency of the divided sensor data by comparing the divided sensor data having been generated with a normal model corresponding to a phase of the divided sensor data; and
estimate the abnormality cause of the target device by comparing the phase of the divided sensor data and the detected abnormal tendency with the abnormality cause model in which a phase being identical to the phase of the divided sensor data, the abnormal tendency of the past sensor data, and the abnormality cause of the target device are associated with each other.

3. The abnormality cause estimation device according to claim 1,
wherein the processing circuitry is further configured to generate the abnormality cause model by associating the detected abnormal tendency with the abnormality cause of the target device.

4. The abnormality cause estimation device according to claim 1
wherein the processing circuitry is further configured to generate the normal model on a basis of the acquired sensor data.

5. An abnormality cause estimation method, comprising:
acquiring sensor data from a sensor installed in a target device;
acquire additional data related to the target device, the additional data including at least one or more data of a set value related to an operation of the target device, an environmental value around the target device, and information about a product manufactured by the target device;
classifying the acquired sensor data for each group according to the acquired additional data;
detecting an abnormal tendency of the sensor data by comparing the acquired sensor data with a normal model in accordance with a group of the sensor data; and
estimating an abnormality cause of the target device by comparing the group of the sensor data and the detected abnormal tendency with an abnormality cause model in which a group being identical to the group of the sensor data, the abnormal tendency of past sensor data, and the abnormality cause of the target device are associated with each other, to identify the abnormality cause of the target device without estimating the abnormality cause by threshold value determination to streamline maintenance work of the target device and predict and prevent abnormality occurrence of the target device.

6. A non-transitory computer readable medium with an executable program stored thereon, wherein the program instructs a computer to perform:
acquiring sensor data from a sensor installed in a target device;
acquiring additional data related to the target device, the additional data including at least one or more data of a set value related to an operation of the target device, an environmental value around the target device, and information about a product manufactured by the target device;
classifying the acquired sensor data for each group according to the acquired additional data;
detecting an abnormal tendency of the sensor data by comparing the acquired sensor data with a normal model in accordance with a group of the sensor data; and estimating an abnormality cause of the target device by comparing the group of the sensor data and the detected abnormal tendency with an abnormality cause model in which a group being identical to the group of the sensor data, the abnormal tendency of past sensor data, and the abnormality cause of the target device are associated with each other, to identify the abnormality cause of the target device without estimating the abnormality cause by threshold value determination to streamline maintenance work of the target device and predict and prevent abnormality occurrence of the target device.

* * * * *